US010923967B2

(12) United States Patent
Klingspor et al.

(10) Patent No.: US 10,923,967 B2
(45) Date of Patent: Feb. 16, 2021

(54) SYSTEM AND A METHOD FOR DETERMINING A RELATIVE POSITION AND/OR ORIENTATION BETWEEN A PRIMARY AND A SECONDARY WINDING STRUCTURE

(71) Applicant: Bombardier Primove GmbH, Berlin (DE)

(72) Inventors: Alexander Klingspor, Karlsruhe (DE); Dirk Mühlenhoff, Mainz (DE); Dominik Anders, Mannheim (DE); Eric Velte, Lampertheim (DE)

(73) Assignee: Bombardier Primove GmbH, Berlin (DE)

( * ) Notice: Subject to any disclaimer, the term of this patent is extended or adjusted under 35 U.S.C. 154(b) by 366 days.

(21) Appl. No.: 15/758,832

(22) PCT Filed: Sep. 9, 2016

(86) PCT No.: PCT/EP2016/071354
§ 371 (c)(1),
(2) Date: Mar. 9, 2018

(87) PCT Pub. No.: WO2017/042364
PCT Pub. Date: Mar. 16, 2017

(65) Prior Publication Data
US 2019/0058362 A1   Feb. 21, 2019

(30) Foreign Application Priority Data

Sep. 11, 2015 (GB) .................................. 1516099.7

(51) Int. Cl.
*H02J 50/90* (2016.01)
*H02J 50/40* (2016.01)
(Continued)

(52) U.S. Cl.
CPC ............ *H02J 50/90* (2016.02); *B60L 53/124* (2019.02); *B60L 53/126* (2019.02); *B60L 53/38* (2019.02);
(Continued)

(58) Field of Classification Search
CPC ........................................................ H02J 7/00
(Continued)

(56) References Cited

U.S. PATENT DOCUMENTS 7,454,170 B2    11/2008  Goossens et al.
2011/0193520 A1  8/2011  Yamazaki et al.
(Continued)

FOREIGN PATENT DOCUMENTS

CN    102834292 A    12/2012
CN    103342101 A    10/2013
(Continued)

*Primary Examiner* — Robert Grant
(74) *Attorney, Agent, or Firm* — The Webb Law Firm

(57) ABSTRACT

The invention relates to a system for determining a relative position and/or orientation between a primary winding structure and a secondary winding structure of a system for inductive power transfer. The system includes at least one secondary-sided transmitting unit, wherein a positioning signal with a positioning frequency is transmittable by the secondary-sided transmitting unit. The system includes at least one primary-sided receiving unit. A signal portion of the received signal with the positioning frequency is determinable. The relative position and/or orientation is determinable depending on the determined signal portion. The invention relates to a method for determining a relative position and/or orientation between a primary winding structure and a secondary winding structure of a system for inductive power transfer.

29 Claims, 3 Drawing Sheets

(51) Int. Cl.
*H02J 50/12* (2016.01)
*B60L 53/38* (2019.01)
*B60L 53/124* (2019.01)
*B60L 53/126* (2019.01)

(52) U.S. Cl.
CPC .............. *H02J 50/12* (2016.02); *H02J 50/40* (2016.02); *Y02T 10/70* (2013.01); *Y02T 10/7072* (2013.01); *Y02T 90/12* (2013.01); *Y02T 90/14* (2013.01)

(58) Field of Classification Search
USPC ........................................................ 320/108
See application file for complete search history.

(56) References Cited

U.S. PATENT DOCUMENTS

| | | | |
|---|---|---|---|
| 2011/0254503 A1* | 10/2011 | Widmer | B60L 53/11 320/108 |
| 2012/0001593 A1 | 1/2012 | Di Guardo | |
| 2012/0095617 A1* | 4/2012 | Martin | B62D 15/028 701/1 |
| 2012/0161530 A1 | 6/2012 | Urano | |
| 2014/0145514 A1 | 5/2014 | Konno et al. | |
| 2015/0151641 A1* | 6/2015 | Berger | H02J 7/00034 320/108 |
| 2015/0175025 A1 | 6/2015 | Barbul et al. | |
| 2016/0028265 A1* | 1/2016 | Bell | H02J 50/12 320/108 |

FOREIGN PATENT DOCUMENTS

| | | |
|---|---|---|
| CN | 103563215 A | 2/2014 |
| DE | 102013110280 A1 | 3/2015 |
| EP | 2717430 A1 | 4/2014 |
| EP | 3028892 A1 | 6/2016 |
| GB | 2522852 A | 8/2015 |
| WO | 2011127455 A2 | 10/2011 |
| WO | 2012111155 A1 | 8/2012 |
| WO | 2014023595 A2 | 2/2014 |
| WO | 2014029414 A1 | 2/2014 |
| WO | 2014183926 A2 | 11/2014 |
| WO | 2015117989 A1 | 8/2015 |

\* cited by examiner

SYSTEM AND A METHOD FOR DETERMINING A RELATIVE POSITION AND/OR ORIENTATION BETWEEN A PRIMARY AND A SECONDARY WINDING STRUCTURE

CROSS-REFERENCE TO RELATED APPLICATIONS

This application is the United States national phase of International Application No. PCT/EP2016/071354 filed Sep. 9, 2016, and claims priority to United Kingdom Patent Application No. 1516099.7 filed Sep. 11, 2015, the disclosures of which are hereby incorporated in their entirety by reference.

BACKGROUND OF THE INVENTION

Field of the Invention

A system and a method for determining a relative position and/or orientation between a primary and a secondary winding structure The invention relates to a system for determining a relative position and/or orientation between a primary and a secondary winding structure of a system for inductive power transfer, in particular to a vehicle.

Description of Related Art

Electric vehicles, in particular a track-bound vehicle, and/or a road automobile, can be operated by electric energy which is transferred by means of an inductive power transfer. Such a vehicle may comprise a so-called receiving device adapted to receive an alternating electromagnetic field and to produce an alternating electric current by electromagnetic induction. Such a receiving device can comprise or provide a so-called secondary winding structure. Furthermore, such a vehicle can comprise a rectifier adapted to convert an alternating current (AC) to a direct current (DC). The DC can be used to charge a traction battery or to operate an electric machine. The rectifier converts the AC provided by the receiving device into the DC.

The inductive power transfer is usually performed using a primary unit which generates the alternating electromagnetic field by a primary winding structure and a secondary unit which comprises the receiving device for receiving said electromagnetic field. The primary unit and the secondary unit can e.g. each comprise a set of three-phase windings providing the aforementioned primary and secondary winding structure. A set of windings of the primary unit can be installed on the ground (primary windings) and can be fed by a wayside power converter (WPC). A set of windings of the secondary unit is installed on the vehicle. For example, the second set of windings can be attached underneath the vehicle, in the case of trams under some of its wagons. The first and the secondary side can be part of a high frequency transformer to transfer electric energy to the vehicle. This transfer can be done in a static state (when there is no movement of the vehicle) and in a dynamic state (when the vehicle moves).

U.S. Pat. No. 7,454,170 B2 discloses an inductive transmission system for inductive transmission of power and full duplex data signals between first and second devices. The transmission system includes a bi-directional inductive channel between the two devices, a transmitter for transmitting a power signal at a first frequency from the first device to the second device over the inductive channel, a first modulating device for modulating a first data signal at a first modulation frequency, and a second modulating device for modulating a second data signal at a second modulation frequency. Further, the transmitters transmit the modulated first data signals from the first device to the second device over the inductive channel and transmit the modulated second data signals from the second device to the first device over the inductive channel. The first modulation frequency and the second modulation frequency are at least a factor two apart.

Inductive power transfer usually requires a correct positioning of a vehicle-sided secondary winding structure relative to a primary winding structure in order to maximize the amount of transfer power but also in order to meet safety requirements and ensure an electromagnetic compatibility.

WO 2011/127455 A2 describes a wireless charging and wireless power alignment of wireless power antennas associated with a vehicle.

WO 2014/023595 A2 discloses a vehicle and an induction charging unit, wherein the induction charging unit comprises a primary coil and the vehicle comprises a secondary coil. Further, in the charging position, the secondary coil is located in a preferred spatial position range with respect to the primary coil with the result that, in order to set the charging position, the system determines, by means of an electromagnetic distance and angle measurement using triangulation, a location which describes a time-dependent spatial position of the secondary coil with respect to the primary coil. The system detects, by means of the location and the charging position, at least one partial driving direction along which the location of a charging position can be approached.

The documents disclose communication antennas of an inductive power transfer (IPT) unit, namely the primary unit or the secondary unit.

Component tolerances and environmental influences can result in detuning of the transmitter devices used for the determination of the relative position and/or orientation. Such a detuning can thus result in measurement errors and imprecise results. Usually, a time consuming calibration of the system is necessary in order to provide the desired accuracy of the results.

There is the technical problem to provide a system and a method for determining a relative position and/or orientation between a primary and a secondary winding structure of an inductive power transfer system, wherein inaccuracies due to component tolerances and environmental influences are minimized while the installation and operational effort for said minimization is reduced.

SUMMARY OF THE INVENTION

The solution to said technical problem is provided by the subject-matter with the features of the present invention.

It is a main idea of the invention to automatically tune a transmitting frequency to the resonant frequency of a resonant circuit of a transmitting unit, wherein the transmitting unit is used to transmit a positioning signal.

Another aspect of the invention is to use a broad-banded receiving unit for receiving the positioning signal in order to provide a reliable reception of the tuned positioning signal.

A system for determining a relative position and/or orientation between a primary and a secondary winding structure of a system for inductive power transfer, in particular to a vehicle, is proposed. The system for inductive power transfer can comprise a primary unit with the primary winding structure and the secondary unit with a secondary winding structure. The vehicle can comprise a secondary unit with the secondary winding structure for receiving an alternating electromagnetic field which is generated by the primary winding structure of a primary unit. The primary winding structure generates the alternating electromagnetic field if the primary winding structure is energized or supplied with operating currents. The primary unit can comprise a totality or a subset of components by which an alternating electromagnetic field for inductive power transfer is generated. Correspondingly, the secondary unit can comprise a totality or a subset of components by which the alternating electromagnetic field for inductive power transfer is received and a corresponding output voltage is provided.

The primary unit can be provided by an inductive power transfer pad. An inductive power transfer pad can be installed on the surface of a route or a parking space or it can be integrated within such a surface.

The present invention can be applied in particular to the field of inductive energy transfer to any land vehicle, for example track bound vehicles, such as rail vehicles (e.g. trams). In particular, the invention relates to the field of inductive energy transfer to road automobiles, such as individual (private) passenger cars or public transport vehicles (e.g. busses).

In the following, reference can be made to a primary-sided coordinate system and a secondary-sided coordinate system. The primary-sided coordinate system can be a coordinate system of the primary winding structure, wherein the secondary-sided coordinate system can be a coordinate system of the secondary winding structure.

The primary-sided coordinate system can comprise a first axis, which can also be referred to as longitudinal axis, wherein the first axis can be a longitudinal axis of the primary winding structure or extend parallel to that axis. A second axis, which can also be referred to as lateral axis, can be a lateral axis of the primary winding structure or extend parallel to that axis. A third axis, which can also be referred to as a vertical axis, can be oriented perpendicular to the first and the second axes. The third axis can be oriented parallel to a desired direction of power transfer, i.e. from the primary unit to the secondary unit. The vertical axis can be oriented from bottom to top if pointing from the primary unit to the secondary unit.

The secondary-sided coordinate system can also comprise a first axis, which can be referred to as longitudinal axis, wherein the first axis can be a longitudinal axis of the secondary winding structure or extend parallel to that axis. A second axis of the secondary winding structure can be referred to as lateral axis, wherein the second axis can be a lateral axis of the secondary winding structure or can extend parallel to that axis. A third axis can be referred to as a vertical axis of the secondary winding structure and can be oriented perpendicular to the first and the second axes of the secondary winding structures. The third axis of the secondary winding structure can be oriented parallel to the desired direction of power transfer.

In the following, a length can be measured along the first axis, a width can be measured along the second axis and a height can be measured along the third axis. Directional terms referring to a direction such as "above", "under", "ahead", "beside" can relate to the aforementioned longitudinal, lateral and vertical axes of the respective coordinate system.

An origin of the primary-sided coordinate system can correspond to a geometric center of the primary winding structure. Correspondingly, an origin of the secondary-sided coordinate system can correspond to a geometric center of the secondary winding structure.

The primary and/or secondary winding structure can comprise at least one subwinding structure. A subwinding structure can be provided by at least one section of the winding structure. In particular, a subwinding structure can provide a loop or a coil, wherein the loop or coil is provided by one or multiple sections of the winding structure. The winding structure can extend along the longitudinal axis of the corresponding coordinate system. Preferably, a winding structure comprises multiple subwinding structures which extend along the longitudinal axis. In this case, successive subwinding structures of the winding structure can be arranged adjacent to one another along said longitudinal axis. Adjacent to each other can mean that central axes of the subwindings, in particular the axes of symmetry, are spaced apart from another, e.g. with a predetermined distance along the longitudinal axis. A loop or coil can be circular-shaped, oval-shaped or rectangular-shaped.

It is possible that the winding structure comprises at least one winding section which extends along the longitudinal axis and at least one winding section which extends along the lateral axis of the corresponding coordinate system. The winding structure, in particular each subwinding structure, can thus be provided by sections extending substantially or completely parallel to the longitudinal axis and sections extending substantially or completely parallel to the lateral axis. In particular, each subwinding can be provided by two sections extending substantially or completely parallel to the longitudinal and two sections extending substantially or completely parallel to the lateral axis.

Further, the system comprises at least one secondary-sided transmitting unit. In the context of this invention, the term "secondary-sided" can mean that the respective element is arranged fixed in position relative to the secondary-sided coordinate system. In particular, a position of the secondary-sided element in the secondary-sided coordinate system can be known. Also, the term "secondary-sided" can mean that the respective element can be part of the secondary unit. Concerning the secondary-sided transmitting unit, a position and orientation within the secondary-sided coordinate system and thus relative to the secondary winding structure, can be known, e.g. by performing a calibration.

Further, a positioning signal with a positioning frequency is transmittable by the secondary-sided transmitting unit. This can mean that the secondary-sided transmitting unit generates the positioning signal with the positioning frequency. The positioning signal denotes a signal used for the determination of the relative position and/or orientation. In particular, the positioning signal can be different from the electromagnetic field for inductive power transfer. Thus, the secondary winding structure cannot be part of the secondary-sided transmitting unit. The positioning signal can be generated with a desired, e. g. constant, transmitting power.

The secondary-sided transmitting unit can comprise a resonant circuit. The positioning frequency can be a frequency of a frequency interval comprising a resonant frequency of a resonant circuit of the secondary-sided transmitting unit. The positioning signal can be a periodic, preferably a harmonic, signal, e.g. a sine or cosine signal.

Further, the system comprises at least one primary-sided receiving unit for receiving a signal comprising the positioning signal. In addition to the positioning signal, the received signal can also comprise other signals. In the context of this invention, the term "primary-sided" can mean that the respective element is arranged fixed in position relative to the primary-sided coordinate system. In particular, a position and/or orientation of the primary-sided element in the primary-sided coordinate system is known. Also, the term "primary-sided" can mean that the respective element is part of the primary unit. In particular, the position and/or orientation of the primary-sided receiving unit in the primary-sided coordinate system and thus relative to the primary winding structure is known.

Further, a signal portion of the received signal with the positioning frequency is determinable. The signal received by the primary-sided receiving unit can comprise multiple signal portions, wherein one signal portion corresponds to the received positioning signal generated by the transmitting unit. Further signal portions can e.g. correspond to interferences.

Determination of the signal portion with the positioning frequency can comprise two steps, wherein in a first step, the positioning frequency is determined, wherein in a second step, the corresponding signal portion is determined. The primary unit or the primary-sided receiving unit can comprise at least one means for determining the signal portion with the positioning frequency, in particular means to determine the positioning frequency and to determine the corresponding signal portion.

The signal portion with the positioning frequency can be determined by a primary-sided control unit, wherein the primary-sided control unit can be part of the primary-sided receiving unit or the primary unit.

Further, the relative position and/or orientation is determinable depending on the determined signal portion. In particular, the relative position and/or orientation can be determinable depending on at least one signal characteristic of the determined signal portion, e.g. a spectral power of the determined signal portion. The relative position can e.g. be determined with the secondary-sided coordinate system or within the primary-sided coordinate system. In the case that the relative position is determined in the primary-sided coordinate system, the relative position can be determined as the position of the origin of the secondary-sided coordinate system within the primary-sided coordinate system. If the relative position is determined in the secondary-sided coordinate system, the relative position can be determined as the position of the origin of the primary-sided coordinate system within the secondary-sided coordinate system.

Correspondingly, the orientation can be determined as the orientation of the secondary-sided coordinate system relative to the primary-sided coordinate system or the orientation of the primary-sided coordinate system relative to the secondary-sided coordinate system. The orientation can e.g. be determined according to the yaw-pitch-role convention.

It is possible to determine the relative position and orientation in a two dimensional coordinate system provided by the longitudinal axes and lateral axis of the primary- or secondary-sided coordinate system. In this case, the vertical distance can be neglected. The relative position and/or orientation can e.g. be determined in a two-dimensional Cartesian coordinate system or in a polar coordinate system.

If the system comprises more than one primary-sided receiving unit for receiving a signal comprising the positioning signal, the signal portion of the received signal with the positioning frequency can be determinable for each receiving unit. Further, the relative position and/or orientation is determinable depending on selected, in particular all, determined signal portions or depending on at least one signal characteristic thereof.

The relative position and/or orientation can e.g. be determined by a secondary-sided control unit or by a primary-sided control unit. This means that the relative position and/or orientation can either be determined on the primary side or on the secondary side.

Information on the relative position and/or orientation can e.g. be provided to a driver of the vehicle or driver assistance system. Thus, these information can be used to position the secondary winding structure relative to the primary winding structure such that an aligned state is provided. The aligned state can be provided if the relative position and/or orientation is within a desired interval of positions and/or orientations, e.g. if the secondary winding structure is arranged above the primary winding structure or within an active volume of the primary winding structure. Further, these information can be used in order to control or enable the inductive power transfer. In particular, the inductive power transfer can only be enabled if the primary and secondary winding structure are in an aligned state.

In a preferred embodiment, the transmitting unit comprises at least one resonant circuit.

The resonant circuit can comprise at least one inductive element and at least one capacitive element. The at least one inductive element can e.g. be provided by an antenna element, in particular an antenna winding structure or antenna coil. The antenna element can be a magnetic element antenna, e. g. a ferrite rod antenna. The resonant circuit can be a series or a parallel resonant circuit.

Further, a resonant frequency of the resonant circuit is determinable. The system can e. g. comprise means for determining the resonant frequency. The resonant frequency can be determined from a range of possible resonant frequencies, wherein the range comprises all or at least a part of changed resonant frequencies which are due to component tolerances and/or environmental influences. Thus, the resonant frequency can be variable. In particular, the resonant frequency can change due to component tolerances and/or environmental influences such as a temperature or pollution. Exemplary means for determining the variable resonant frequency will be explained later.

The resonant frequency of the resonant circuit can be determined by a secondary-sided control unit, wherein the control unit can be part of the transmitting unit or the secondary unit.

Further, the positioning frequency is chosen as the resonant frequency. Alternatively, the positioning frequency is chosen as a frequency which does not deviate from the resonant frequency more than a predetermined amount, e.g. not more than 1%, 5% or 10%. In this case, the positioning frequency can be chosen as a frequency which is different from the resonant frequency.

Determining the resonant frequency and transmitting the positioning signal with a determined resonant frequency or a frequency close to the resonant frequency advantageously allows operating the resonant circuit with minimal power losses. Determining the signal portion with the resonant frequency on the primary side advantageously allows identifying the positioning signal in a broader spectrum, which, in turn, increases the accuracy of the determination of the relative position and/or orientation. Further, the determination of the resonant frequency advantageously allows to energize the resonant circuit with a maximal current if the driving voltage is limited, e.g. to a maximal output voltage of a signal generator. If the frequency does not match the resonant frequency, the circuit impedance can prevent the current flow even if the signal generator provides its maximal output voltage.

In a preferred embodiment, the secondary-sided transmitting unit comprises at least on signal generator for generating an operating signal for the resonant circuit. The frequency of the operating signal is adjustable. Further, an amplitude of the operating signal can be adjustable. The signal generator can comprise semiconductor elements, e.g. MOSFETs or IGBTs. These elements can be arranged in a so-called half- or full-bridge arrangement. Alternatively, the signal generator can comprise any other means for a digital-to-analogue converter. The signal generator can e.g. be provided by a so-called driver chip. If the operating signal is applied to the resonant circuit, the resonant circuit transmits the positioning signal.

The operating signal can be a periodic signal, in particular a harmonic signal. Preferably, the operating signal is a sine or a cosine signal. The signal generator can invert a direct current (DC) input signal into an alternating current (AC) output signal which provides the operating signal. In summary, positioning signals with different frequencies can be generated by the signal generator and the resonant circuit.

In another preferred embodiment, the resonant frequency is determinable depending on an input power to the signal generator. The input power can be determined depending on an input current and an input voltage of the signal generator, e. g. as the product of the input current and the input voltage. The input current and/or the input voltage can be determined by a respective measuring means, e.g. a current sensor or a voltage sensor. The input power can thus be the power provided by a DC input current and a DC input voltage.

Alternatively or in addition, the resonant frequency is determinable depending on an output power of the signal generator. The output power can be determined depending on the output voltage and an output current of the signal generator, e.g. as the product of the output current and the output voltage. The output voltage can e.g. correspond to the aforementioned input voltage.

The system or the transmitting unit can comprise means for determining said input and/or output power, e.g. a control unit.

It is, for instance, possible that the frequency of the operating signal is varied within a set of adjustable frequencies until the input power and/or the output power is maximized.

Determination of the resonant frequency can be performed before the transmission of a positioning signal or periodically. The positioning signal can be transmitted during a parking procedure of the vehicle over a primary unit, e.g. over a charging pad. The parking procedure can e.g. be detected based on information transmitted between the primary unit and the secondary unit. The positioning signal can be switched off after the parking procedure is finished. Alternatively, the positioning signal can be transmitted during the process of inductive power transfer. In this case, protective measures against interferences of the positioning signal should be provided.

This advantageously provides a simple and accurate determination of the resonant frequency which can vary due to component tolerances and/or environmental influences.

In another embodiment, the at least one primary-sided receiving unit is a narrow-band receiving unit. This can mean that a reception sensitivity of the primary-sided receiving unit is higher than a predetermined threshold value for a predetermined range of frequencies which can also be referred to as detection range. The bandwidth of said detection range can preferably be equal to a few 100 Hz.

Said detection range of frequencies can be a subrange of a range of frequencies which can comprise frequencies of the LF frequency band, e.g. frequencies between 80 kHz to 300 kHz, preferably frequencies between 100 kHz to 150 kHz. This advantageously allows reducing field warping due to metallic surfaces on the ground. It is, however, also possible to selected a higher frequency, e.g. a frequency higher than 300 kHz, in particular if a direct line of sight is available. This advantageously allows receiving positioning signals with varying frequencies with a desired reception sensitivity.

The usage of a narrow-band receiving unit advantageously allows minimizing an interference by further signals which are provided by other transmitters but are not used for the determination of the relative position and/or orientation.

In another embodiment, the system comprises at least two primary-sided receiving units, wherein the at least two receiving units are direction-sensitive receiving units. Main reception directions of the at least two receiving units are oriented differently. For example, a receiving unit can comprise a receiving antenna winding structure or a receiving antenna coil. In particular, a receiving unit can be provided by a directional antenna. This can mean that a maximal receiving sensitivity is provided for signals received from a desired direction.

Preferably, a receiving unit or a direction-sensitive receiving unit can comprise a magnetic element antenna, in particular a ferrite rod antenna. It is, however, also possible that the transmitting unit can comprise a magnetic element antenna, e.g. a ferrite rod antenna, wherein the winding structure of the magnetic element antenna provides at least a part of the inductive element of the resonant circuit.

It is further possible that the system comprises at least three primary-sided receiving units, wherein the at least three receiving units are direction-sensitive receiving units and main reception directions of the at least three receiving units are oriented differently. In particular, the main reception directions of two or three receiving units can be oriented orthogonal to each other.

In the case of multiple receiving units, the signal portion of the received signal with the positioning or resonant frequency is determinable for each receiving unit. The relative position and/or orientation is then determinable depending on all signal portions of the set of signals receiver by all receiving units, in particular depending on a relationship between these signal portions.

In a preferred embodiment, a main reception direction of a first receiving unit is oriented parallel to a longitudinal axis of the primary winding structure, i.e. parallel to the longitudinal axis of a primary-sided coordinate system. Further, a main reception direction of a second receiving unit is oriented parallel to a lateral axis of the primary winding structure, i.e. parallel to the lateral axis of the primary-sided coordinate system. A main reception direction of a third receiving unit can then be parallel to a vertical axis of the primary winding structure, i.e. parallel to a vertical axis of the primary-sided coordinate system.

In another preferred embodiment, the system comprises at least two pairs of at least two primary-sided receiving units. The at least two receiving units are direction-sensitive receiving units, wherein a main reception direction of the at least two receiving units of one pair are oriented differently, wherein the receiving units of one pair are arranged close together. In particular, the main reception directions of the receiving units of one pair can be oriented parallel to the longitudinal axis and parallel to the lateral axis, respectively. In the context of this invention, the term "close together" can mean that the antenna elements, e.g. the antenna winding structures are arranged within a predetermined (small) volume. Further, close together can mean that the geometric centres of the antenna elements are spaced apart by at least a predetermined maximal distance within the primary-sided coordinate system. The maximal distance can e.g. be 500 mm or even smaller.

The two pairs, however, can be spaced apart with a distance which is larger than said maximal distance between the two antenna elements of the receiving units of one pair.

This advantageously allows receiving the positioning signal at various locations on the primary side and with different orientations. Hence, the accuracy of the determination of the relative position and/or orientation can be advantageously improved.

In another embodiment, the system comprises a primary-sided AD-converter (analogue to digital converter). The received signal is digitizable by the AD-converter. If there is more than one receiving unit, each of the received signals is digitizable by the same AD-converter or by different AD-converters. The use of an AD-converter advantageously simplifies the determination of the signal portion corresponding to the positioning signal based on the digitized signal.

In another embodiment, the system comprises at least one spectrum determining means, wherein a spectrum of the received signal is determinable by the at least one spectrum determining means. The spectrum can e.g. be determinable based on the digitized signal. The spectrum determining means can e.g. be provided by a filter means, e.g. a filter performing a fast fourier transformation (FFT). The spectrum determining means can also be provided by a control unit, in particular a primary-sided control unit.

Based on the spectrum, the signal portion of the received signal with the positioning frequency or at least one signal characteristic of that portion can be determined. It is, for instance, possible to determine the spectral portion within the spectrum with the positioning frequency or comprising the positioning frequency, wherein the spectral power of said portion is determinable, wherein the relative position and/or orientation is determinable depending on said spectral power.

Additionally, it is possible to determine the spectral power for multiple frequencies, wherein the positioning frequency is chosen as the frequency corresponding to the portion with the maximal spectral power. In summary, it is possible to determine either both, the positioning frequency and the corresponding signal portion, or only the signal portion based on the spectrum. In the latter case, the positioning frequency must be known beforehand.

Determining the spectrum advantageously allows a robust and accurate determination of the signal portion with the positioning frequency or at least one characteristic, e. g. a spectral power, of said signal portion.

In another embodiment, the positioning frequency is determinable based on the spectrum. This has been explained before. For instance, the positioning frequency can be determined as the frequency corresponding to a signal portion with a maximum spectral power in the spectrum or in a predetermined portion of the spectrum. This advantageously allows a simple but robust determination of the positioning frequency on the primary side.

In another embodiment, the system comprises at least one communication means for a communication between a primary unit and a secondary unit. The communication means can e.g. be means for a unidirectional communication or, preferably, for a bidirectional communication. The communication can be a signal or data communication. The communication means can provide a wireless communication.

It is possible that the positioning frequency which is determined on the secondary side, e.g. by a secondary-sided control unit, can be communicated to the primary side, e.g. a primary-sided control unit. Based on this communicated positioning frequency, the signal portion of the received signal can be determined. In this case, the positioning frequency communicated from the secondary side to the primary side can be used as the positioning frequency and the signal portion of the received signal with the positioning frequency is determined as the signal portion with the communicated positioning frequency.

Further, in particular if the relative position and/or orientation is determined on the primary side, corresponding information can be communicated to the secondary side.

In another embodiment, the relative position and/or orientation is determinable by a primary-sided evaluation unit. The primary-sided evaluation unit can be provided by one of the aforementioned primary-sided control units.

Alternatively or in addition, the relative position and/or orientation is determinable by a secondary-sided evaluation unit. The secondary-sided evaluation unit can also be provided by one of the aforementioned secondary-sided control units.

The relative position and/or orientation can e.g. be determined by using at least one data base, wherein the data base contains or encodes a relationship between the at least one determined signal portion, in particular at least one signal characteristic of the determined signal portion, and the relative position and/or orientation. The data base can also be referred to as look-up table. The data base can be generated by performing a calibration process.

If more than one primary-sided receiving unit is used, the data base can contain a relationship between a set of determined signal portions, e.g. a set of signal characteristics of the determined signal portions, and the relative position and/or orientation. If the data base does not cover all possible relationships, an interpolation method can be used in order to determine the relative position and/or orientation for a set of determined signal portions or characteristics which is not explicitly contained in the data base.

If the relative position and/or orientation is determinable by the secondary-sided evaluation unit, it can be necessary to communicate the determined signal portion, e.g. at least one signal characteristic of the determined signal portion, e.g. the spectral power, from the primary side to the secondary side, e.g. via the proposed communication means.

Determining the relative position and/or orientation on the secondary side advantageously allows using secondary-sided units which reduce the installation requirements for the primary unit. Determining the relative position and/or orientation by a primary-sided evaluation unit instead of a secondary-sided evaluation unit advantageously allows reducing the installation space and weight of the secondary unit. Since the primary unit allows integrating transmitting units with larger antenna units, an antenna range can be increased which, in turn, improves the accuracy of the position determination.

In another embodiment, at least one primary-sided receiving unit is at least partially provided by at least one winding structure of an inductive object detection system. The object detection system can be a system for detecting a foreign object, in particular a foreign metal object, inside and/or outside an active volume of the primary winding structure.

The object detection system can comprise inductive and capacitive elements, wherein these elements can be different from the elements of the resonant circuit of the proposed system. Such elements advantageously allow detecting a foreign object depending on a change of an inductance or capacitance of the aforementioned inductive or capacitive elements. The detection system is designed as an inductive sensing system, wherein the inductive sensing system can comprise one or multiple detection winding(s) and, if applicable, one or more excitation winding(s). Using an inductive detection system, an active or passive detection can be realized. In the case of an active detection, one or more excitation winding(s) and one or more detection winding(s) can be used. An active object detection can be performed by monitoring at least one characteristic properties of an excitation field generated by the excitation winding(s) and received by the detection winding(s). In the case of a passive detection, only one or more passive detection winding(s) are used. The passive object detection is performed by monitoring at least one characteristic of the passive winding(s), in particular an inductance.

In particular, the at least one primary-sided receiving unit can be at least partially provided by or comprise one detection winding structure. Alternatively, the at least one primary-sided receiving unit can be at least partially provided by or comprise one excitation winding structure. Preferably, the detection winding structure can provide a receiving antenna structure of the primary-sided receiving unit. Alternatively or in addition, the primary-sided AD-converter is provided by an AD-converter of the inductive object detection system. In this case, the inductive object detection system can comprise an AD-converter in order to digitize the output signals of one or multiple detection windings.

For example, an amplitude and/or a phase value of the signal received by the at least one winding structure of the inductive object detection system or the signal portion of the received signal with the positioning frequency can be determined. Then, the relative position and/or orientation is determinable depending on the determined amplitude and/or phase value.

Determination of the relative position and/or orientation based on the signal received by the at least one winding structure of the inductive object detection system can be performed alternatively or in addition to the determination of the relative position and/or orientation based on the signal portion with the positioning frequency received by a primary-sided receiving unit. In other words, the system can comprise multiple primary-sided receiving units, wherein one or multiple, but not all, receiving units can be at least partially provided by at least one winding structure of the inductive object detection system. Determination of the relative position and/or orientation based on the signal received by the at least one winding structure of the inductive object detection system can e.g. be performed for a near field positioning, e.g. if the secondary unit is arranged directly above the primary unit.

The inductive object detection system can comprise multiple detection and/or exciting winding structures, wherein these winding structures can be distributed, preferably evenly, across an active area assigned to the primary winding structure. The active area can denote an area covering the primary winding structure. The multiple detection and/or exciting winding structures can e.g. be arranged in an array-like structure.

In another embodiment, a primary unit of the system for inductive power transfer comprises at least one magnetically conducting element, wherein the at least one magnetically conducting element and/or the at least one primary-sided receiving unit are arranged and/or designed such that the magnetic field used to transmit the positioning signal is directed along a longitudinal axis of the at least one primary-sided receiving unit.

The magnetically conducting element or an arrangement of multiple magnetically conducting elements can be arranged and/or designed such that the magnetic field for power transfer is primarily directed along a longitudinal axis of a primary-sided reference coordinate system.

Further, the magnetically conducting element or the arrangement of multiple magnetically conducting elements and/or the at least one primary-sided receiving unit can be arranged and/or designed such that the magnetic field used to transmit the positioning signal is directed along a longitudinal axis of a primary-sided ferrite rod antenna which extends along the longitudinal direction of the primary-sided reference coordinate system.

Further, the magnetically conducting element or the arrangement of multiple magnetically conducting elements and/or the primary-sided ferrite rod antennas can be arranged and/or designed such that the magnetic field used to transmit the positioning signal is guided through the at least one primary-sided ferrite rod antenna.

This advantageously allows increasing the field strength of the electromagnetic field used to transmit the positioning signal in the primary-sided receiving unit.

Further proposed is a method for determining a relative position and/or orientation between a primary winding structure and a secondary winding structure of a system for inductive power transfer. The method can be performed by a system according to one of the embodiments described in this invention.

A positioning signal with a positioning frequency is transmitted by the secondary-sided transmitting unit. Further, a signal is received by at least one primary-sided receiving unit, wherein the received signal comprises the positioning signal. The received signal can be provided by the transmitted position signal at least partially. Further, a signal portion of the received signal with the positioning frequency is determined. This signal portion of the received signal can correspond to the transmitted positioning signal which is received by the receiving unit. Further, the relative position and/or orientation is determined depending on the determined signal portion, in particular depending on at least one signal characteristic of the determined signal portion. Preferably, the relative position and/or orientation is determined depending on a spectral power of the determined signal portion.

This advantageously allows a robust and accurate determination even if there are component tolerances and/or environmental influences which change signal characteristics of the positioning signal.

In another embodiment, a resonant frequency of a resonant circuit of a secondary-sided transmitting unit is determined, e.g. from a range of possible resonant frequencies which covers different resonant frequencies due to component tolerances and/or environment influences. Further, the positioning frequency is chosen as the resonant frequency.

In another embodiment, the frequency of an operating signal of a signal generator is adjusted. The signal generator can be a secondary-sided signal generator. Further, the signal generator can be part of the transmitting unit. The operating signal is an operating signal of the resonant circuit. In particular, the frequency of the operating signal can be adjusted such that it corresponds to a resonant frequency of the resonant circuit.

This advantageously allows operating the resonant circuit with minimal power losses. The frequency of the operating signal can be varied within a range interval of frequencies. The range can comprise the resonant frequency with ideal components and the resonant frequencies with maximal tolerances of these components.

In another embodiment, the resonant frequency is determined depending on an input power and/or output power to/of the signal generator. In particular, the resonant frequency can be determined as the frequency of the operating signal, at which the input power and/or output power of the signal generator is maximal.

This advantageously allows a simple determination of the resonant frequency even if there are component tolerances.

In another embodiment, a signal comprising the positioning signal is received by at least two primary-sided receiving units, wherein the at least two receiving units are direction-sensitive receiving units, wherein a main reception direction of the at least two receiving units are oriented differently. Of course, the transmitted positioning signal can also be received by a third receiving unit. This has been explained before. Then, the signal portions of the received signals with the positioning frequency can be determined for each receiving unit, wherein the relative position and/or orientation can be determined based on these determined signal portions or based on at least one signal characteristic of these determined signal portions.

In another embodiment, the received signal(s) is/are digitized. This advantageously simplifies a signal processing in order to determine the signal portion with the positioning frequency.

In another embodiment, a spectrum of the received signal is determined. This has been explained before.

In another embodiment, the positioning frequency is determined based on the spectrum of the at least one received signal. It is, for instance possible, to transform the received signal, in particular the digitized received signal into the frequency domain, e.g. by a known transformation, preferably a fast fourier transformation. Then, the positioning frequency can be determined as the frequency of a signal portion of the spectrum with a maximum spectral power. This advantageously allows a simple identification of the positioning frequency on the primary side.

In another embodiment, a frequency interfering means is detected based on the spectrum. It is, for instance, possible to detect interference means if there are multiple local maxima of the spectral power within the spectrum. In this case, the frequency of at least one of these local maxima can be determined as the positioning frequency, wherein the remaining frequencies are identified as frequencies of interference signals. If such a frequency interfering means is detected, an alarm signal can be generated. The alarm can e.g. be used to control an alignment process and/or the inductive power transfer process. It is, for instance, possible to terminate an ongoing alignment and/or power transfer process or to prevent a start of a power transfer process if an alarm signal is generated.

In another embodiment, the positioning frequency is communicated from the secondary unit to the primary unit. This means that corresponding information, e. g. information encoding the value of the positioning frequency, can be communicated, in particular transmitted, from the secondary unit to the primary unit. This can e.g. be performed by using an adequate communication means, e.g. a wireless communication means.

Then, this communicated positioning frequency can be taken as the positioning frequency of the signal portion of the received signal which is to be determined for the final determination of the relative position and/or orientation.

This means that there are at least two options for determining the positioning frequency on the primary side. In a first option, the positioning frequency can be determined based on the spectrum, wherein in a second option, information on the positioning frequency are transmitted from the secondary side to the primary side.

In another embodiment, the relative position and/or orientation is determined by a primary-sided and/or a secondary-sided evaluation unit. This has been explained before.

In another embodiment, different secondary-sided transmitting units are operated with different frequencies. The frequencies can be equal to the corresponding resonant frequencies or different from their respective resonant frequencies as long as the frequencies are different from one another.

In this case, the determination of the relative position and/or orientation can be based on positioning signals with different frequencies which advantageously increases the accuracy. In this case, however, it can be necessary to transmit the frequency information of the frequencies of the operating signals from the secondary side to the primary side in order to reliably detect the corresponding signal portions of the received signal(s). In this case, only one of the secondary-sided transmitting units can be operated with the positioning frequency.

BRIEF DESCRIPTION OF THE DRAWINGS

The invention will be explained with reference to the attached figures. The figures show.

DESCRIPTION OF THE INVENTION

Figure 1:
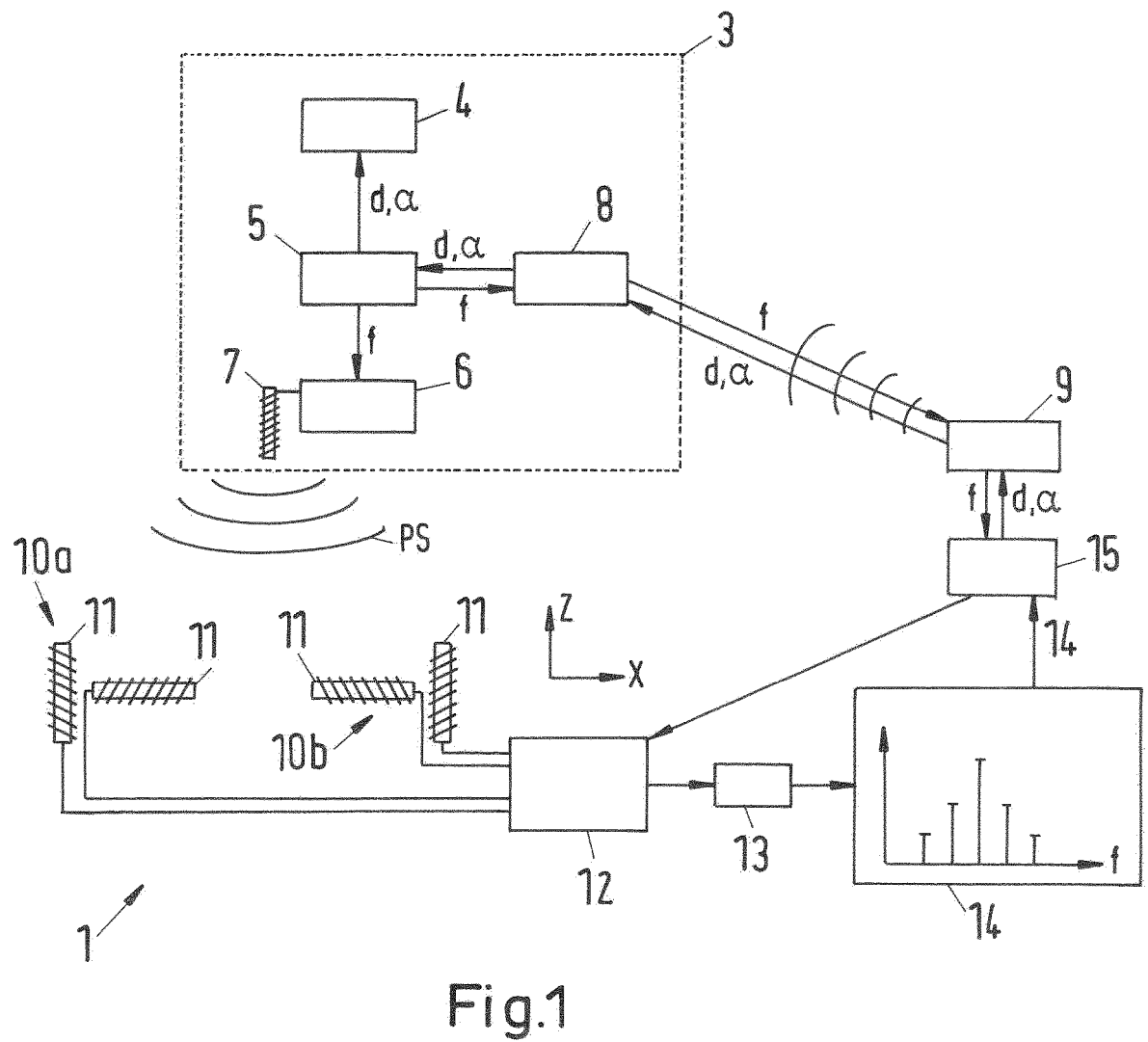
FIG. 1 a schematic block diagram of a system according to the invention.

In the following, identical reference numerals denote elements with the same or similar technical features.

FIG. 1 shows a schematic block diagram of a system 1 for determining a relative position and/or orientation between a primary winding structure 18 (see FIG. 3) and a secondary winding structure 21 (see FIG. 3) of a system 2 (see FIG. 3) for inductive power transfer. A vehicle 3 comprises a human-machine interface 4 (HMI 4) which can e.g. be provided by a touchscreen in the passenger compartment. Further, the vehicle 3 comprises a secondary-sided control unit 5 which can e.g. be provided by a microcontroller. Further, the vehicle 3 comprises a signal generator 6 and a ferrite rod antenna 7. The signal generator 6 can generate an operating signal with a desired frequency f, in particular a harmonic signal. If energized with the operating signal, the ferrite rod antenna 7 generates a positioning signal PS. Thus, a low-frequency positioning signal PS is transmitted by the ferrite rod antenna 7. The signal generator 6 and the ferrite rod antenna 7 are parts of a secondary-sided transmitting unit. The ferrite rod antenna 7 provides or is part of a resonant circuit of this transmitting unit.

The control unit 5 can control the signal generator such that the frequency f is varied until an input power of the signal generator 6 for generating the operating signal is maximized. The frequency f of the operating signal (and thus of the positioning signal PS) can be varied in a frequency interval ranging from 80 kHz to 300 kHz or 400 kHz. If the input power is maximized, the frequency f corresponds to a resonant frequency of the resonant circuit comprising the ferrite rod antenna 7.

Further, the vehicle 3 comprises a wireless communication interface 8. The control unit 5 controls an operation of the HMI 4 via a signal connection. Further, the control unit 5 controls the operation of the signal generator 6 via a signal connection. The control unit 5 is also connected to the interface 8 via a bidirectional data communication. The control unit 5 can e.g. transmit information on the frequency f of the operating signal to the interface 8, wherein the interface 8 transmits this information to a primary-sided wireless communication interface 9.

The system 1 further comprises two pairs 10a, 10b of ferrite rod antennas 11. The primary-sided ferrite rod antennas 11 provide primary-sided receiving units with a desired signal reception band. The signal reception band can e.g. comprise a frequencies with a bandwidth of 5 kHz or 10 kHz. A centre frequency of the signal reception band can correspond to the desired positioning frequency.

The ferrite rod antennas 11 provide direction-sensitive receiving units, wherein main reception directions of the two ferrite rod antennas 11 of one pair 10a, 10b are oriented differently.

FIG. 1 shows a primary-sided reference coordinate system, wherein a longitudinal axis x and a vertical axis z are shown. A lateral axis y (not shown) is oriented perpendicular to the lateral and the vertical axes x, z. The axes x, y, z can be axes of the primary winding structure 18. It is shown that one ferrite rod antenna 11 of each pair 10a, 10b is oriented such that a main reception direction is oriented parallel to the longitudinal axis x and the remaining ferrite rod antenna 11 is oriented such that the main reception direction is oriented parallel to the vertical axis z.

The ferrite rod antennas 11 are connected to an AD-converter 12. Upon reception of a signal comprising the positioning signal PS, ferrite rod antennas 11 will generate an analogue output signal. However, the ferrite rod antennas 11 will receive other signal 5 than the positioning signal PS. The AD-converter 12 digitizes the resulting signal 5 of each ferrite rod antenna 11. A filter 13 performs a fast fourier transformation and provides a spectrum 14 of each of the received signals. The spectrum 14 is transmitted to a primary-sided control unit 15. The primary-sided control unit 15 is connected to the primary-sided interface 9. The interface 9 transmits the frequency f of the operating signal to the primary-sided control unit 15. Based on the transmitted frequency f, the primary-sided control unit 15 determines the signal portion of the received signals with this frequency f and its spectral power.

Thus, four values of a spectral power are determined, namely one value per primary-sided ferrite rod antenna 11. Based on a data base (not shown) and these values, the primary-sided control unit 15 can determine a relative position and/or orientation of the primary winding structure 18 and the secondary winding structure 21. The relative position and/or orientation can e.g. be provided by a distance d between geometric centres of the primary and secondary winding structures 18, 21 and angles of rotation between a primary-sided reference coordinate system and the secondary-sided reference coordinate system. The distanced and the angle(s) a can be transmitted from the primary-sided control unit 15 to the primary-sided interface 9, to the secondary-sided interface 8, to the secondary-sided control unit 5 and to the HMI 4. Thus, information on the distance d and the orientation can be provided to a passenger or a driver of the vehicle 3.

Figure 2:
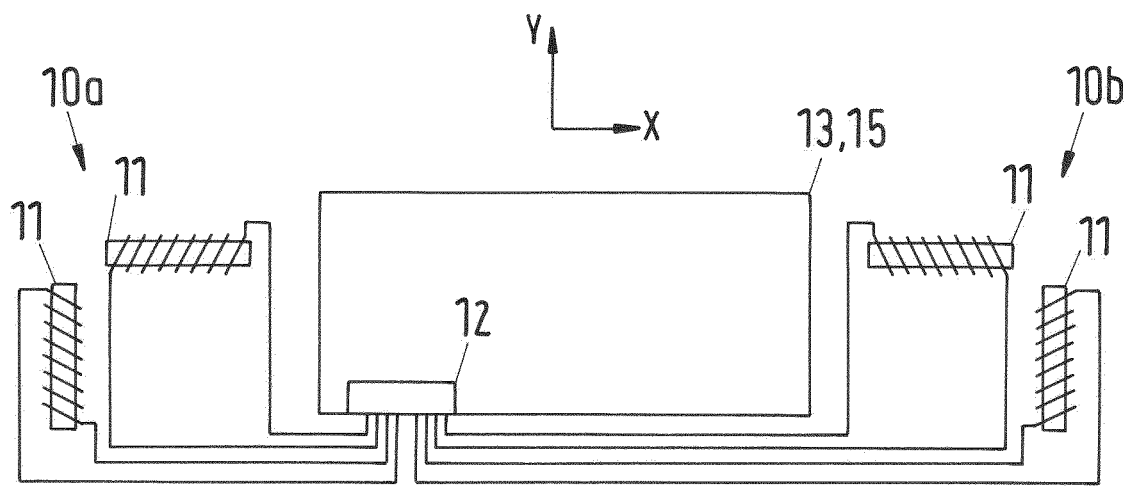
FIG. 2 a schematic block diagram of primary-sided receiving units.

FIG. 2 shows a detailed block diagram on primary-sided parts of the system 1 for determining a position and/or orientation of a primary winding structure 18 to a secondary winding structure 21 (see FIG. 3) of a system 2 for inductive power transfer. The position and/or orientation information can be used in order to navigate a vehicle such that a desired alignment of primary winding structure 18 and a secondary winding structure 21 is achieved. Only if an aligned state is provided, an inductive power transfer can be performed.

In FIG. 2, four ferrite rod antennas 11 are shown, wherein two ferrite rod antennas 11 provide one pair 10a, 10b of two pairs of primary-sided receiving units. In contrast to the embodiment shown in FIG. 1, a main reception direction of one ferrite rod antenna 11 of each pair 10a, 10b is oriented parallel to a longitudinal axis x of a primary-sided reference coordinate system, wherein the main reception direction of the remaining ferrite rod antenna 11 of the pair 10a, 10b is oriented parallel to the lateral axis y of the primary-sided reference coordinate system.

The winding structures of each ferrite rod antenna 11 are connected to an AD-converter 12. The AD-converter 12 can be an AD-converter 12 of a foreign object detection system. The foreign object detection system can comprise one or multiple detection windings (not shown). It is also possible that one or more ferrite rod antennas 11 can be detection windings of the foreign object detection system.

Further shown are a primary-sided control unit 15 and filter 13 for performing the fast fourier transform.

Figure 3:
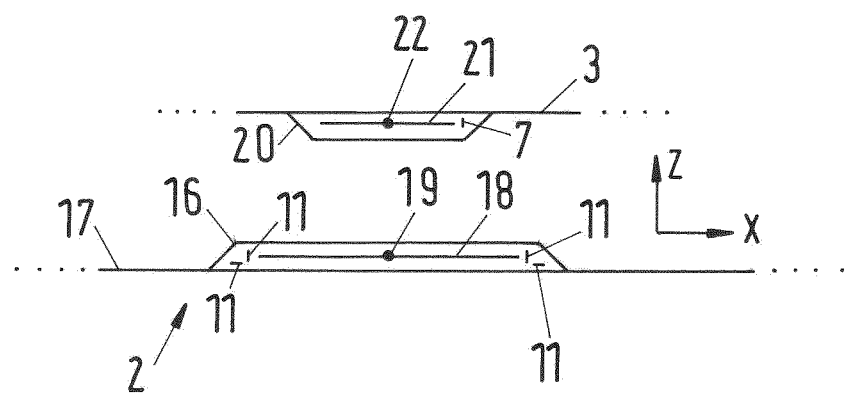
FIG. 3 a schematic block diagram of a system for inductive power transfer.

FIG. 3 shows a schematic block diagram of a system 2 for inductive power transfer to a vehicle 3. Shown is an inductive power transfer pad 16 which is installed on a surface 17 of a route. The inductive power transfer pad 16 comprises a primary winding structure 18 with a geometric centre 19. Further shown is a primary-sided reference coordinate system, wherein a longitudinal axis x and a vertical axis z are shown. Above the inductive power transfer pad 16 which provides a primary unit, a secondary unit 20 with a secondary winding structure 21 is shown. Further shown is a geometric centre 22 of the secondary winding structure 21. Indicated are primary-sided ferrite rod antennas 11 which provide receiving units and a secondary-sided ferrite rod antenna 7 which provides a transmitting unit of a system 1 for determining the relative position and/or orientation between the primary winding structure 18 and the secondary winding structure 21.

Figure 4:
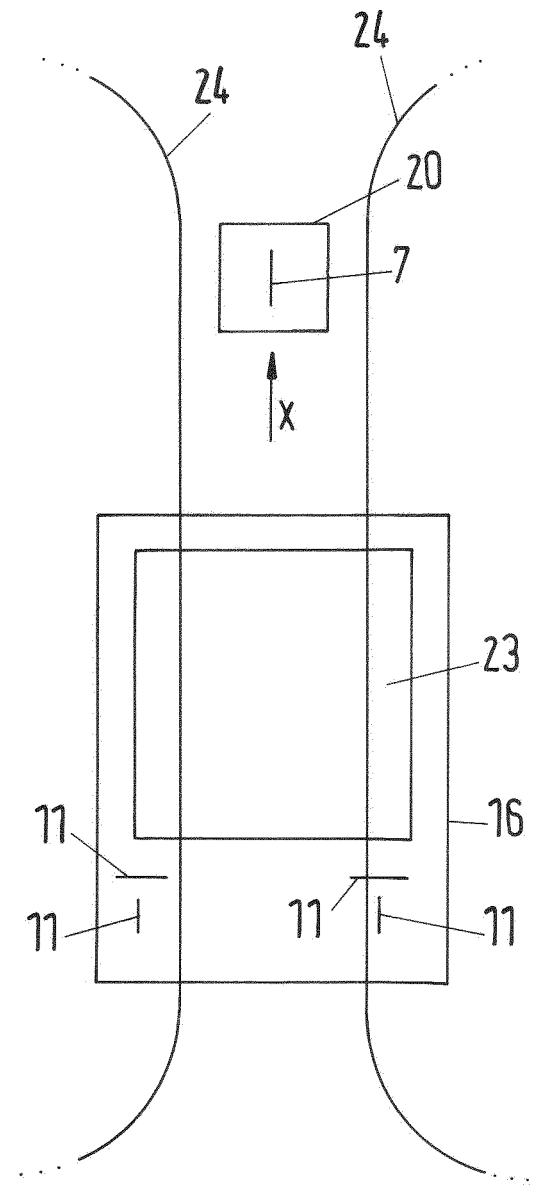
FIG. 4 a schematic top view on a system for inductive power transfer.

FIG. 4 shows a schematic top view on a system 2 for inductive power transfer. Shown is an inductive power transfer pad 16. Not shown is the primary winding structure 18 (see e.g. FIG. 3). The inductive power transfer pad 16 comprises at least one magnetically conducting element 23. It is shown that the magnetically conducting element 23 is arranged and/or designed such that the magnetic field 24 for power transfer is primarily directed along a longitudinal axis x of the primary-sided reference coordinate system.

Further, the magnetically conducting element 23 and/or the primary-sided ferrite rod antennas 11 are arranged and/or designed such that the magnetic field used to transmit the positioning signal is also directed along a longitudinal axis of at least one of the primary-sided ferrite rod antennas 11, in particular along a longitudinal axis of a primary-sided ferrite rod antenna 11 which extends along the longitudinal direction x of the primary-sided reference coordinate system. Further, the magnetically conducting element 23 or the arrangement of multiple magnetically conducting elements 23 and/or the primary-sided ferrite rod antennas 11 are arranged and/or designed such that the magnetic field used to transmit the positioning signal is guided through the at least one primary-sided ferrite rod antenna 11.

This advantageously allows increasing the field strength of the electromagnetic field used to transmit the positioning signal in the primary-sided ferrite rod antennas 11.

Further shown is a secondary unit 20 with a secondary-sided ferrite rod antenna 7.

The invention claimed is:

1. A system for determining a relative position and/or orientation between a primary winding structure and a secondary winding structure of a system for inductive power transfer, wherein the system comprises at least one secondary-sided transmitting unit, wherein a positioning signal with a positioning frequency is transmittable by the secondary-sided transmitting unit, wherein the system comprises at least one primary-sided receiving unit, wherein a signal portion of the received signal with the positioning frequency is determinable, wherein the relative position and/or orientation is determinable depending on the determined signal portion, wherein the relative position and/or orientation is determined by a primary-sided control unit, wherein information on the relative position and/or orientation determined by the primary-sided control unit are communicated to the secondary side, wherein the signal received by the primary-sided receiving unit comprises multiple signal portions, wherein one of said signal portions corresponds to the received positioning signal generated by the transmitting unit, wherein determination of the signal portion with the positioning frequency comprises a first step where the positioning frequency is determined and a second step where the corresponding signal portion is determined.

2. The system according to claim 1, wherein the secondary-sided transmitting unit comprises at least one resonant circuit, wherein a resonant frequency of the resonant circuit is determinable, wherein the positioning frequency is chosen as the resonant frequency or does not deviate from the resonant frequency more than a predetermined amount.

3. The system according to claim 2, wherein the secondary-sided transmitting unit comprises at least on signal generator for generating an operating signal for the resonant circuit, wherein a frequency of the operating signal is adjustable.

4. The system according to claim 3, wherein the resonant frequency is determinable depending on an input power and/or output power to/of the signal generator.

5. The system according to claim 1, wherein the at least one primary-sided receiving unit is a narrow-band receiving unit.

6. The system according to claim 1, wherein the system comprises at least two primary-sided receiving units, wherein the at least two primary-sided receiving units are direction-sensitive receiving units, wherein main reception directions of the at least two primary-sided receiving units are oriented differently.

7. The system according to claim 6, wherein a main reception direction of a first receiving unit is oriented parallel to a longitudinal axis of the primary winding structure, wherein a main reception direction of a second receiving unit is oriented parallel to a lateral axis of the primary winding structure.

8. The system according to claim 6, wherein the system comprises at least two pairs of at least two primary-sided receiving units, wherein the at least two primary-sided receiving units are direction-sensitive receiving units, wherein a main reception direction of the at least two primary-sided receiving units of one pair are oriented differently, wherein the receiving units of one pair are arranged close together.

9. The system according to claim 1, wherein the system comprises a primary-sided analog to digital converter, wherein the received signal is digitizable by the primary-sided analog to digital converter.

10. The system according to claim 1, wherein the system comprises at least one spectrum determining means, wherein a spectrum of the received signal is determinable by the at least one spectrum determining means.

11. The system according to claim 10, wherein the positioning frequency is determinable based on the spectrum.

12. The system according to claim 1, wherein the system comprises at least one communication means for a communication between a primary unit and a secondary unit.

13. The system according to claim 1, wherein the relative position and/or orientation is determinable by a primary-sided and/or a secondary-sided evaluation unit.

14. The system according to claim 1, wherein at least one primary-sided receiving unit is at least partially provided by at least one winding structure of an inductive object detection system and/or the primary-sided analog to digital converter is provided by an analog to digital converter of the inductive object detection system.

15. The system according to claim 1, wherein a primary unit comprises at least one magnetically conducting element, wherein the at least one magnetically conducting element and/or the at least one primary-sided receiving unit are arranged and/or designed such that the magnetic field used to transmit the positioning signal is directed along a longitudinal axis of the at least one primary-sided receiving unit.

16. A method for determining a relative position and/or orientation between a primary winding structure and a secondary winding structure of a system for inductive power transfer comprising: transmitting a positioning signal with a positioning frequency by the secondary-sided transmitting unit, receiving a signal comprising the positioning signal by at least one primary-sided receiving unit, determining a signal portion of the received signal with the positioning frequency, and determining the relative position and/or orientation depending on the determined signal portion, wherein the relative position and/or orientation is determined by a primary-sided control unit, wherein information on the relative position and/or orientation determined by the primary-sided control unit are communicated to the secondary side, wherein the signal received by the primary-sided receiving unit comprises multiple signal portions, wherein one of said signal portions corresponds to the received positioning signal generated by the transmitting unit, wherein determination of the signal portion with the positioning frequency comprises a first step where the positioning frequency is determined and a second step where the corresponding signal portion is determined.

17. The method according to claim 16, comprising determining a resonant frequency of a resonant circuit of a secondary-sided transmitting unit, wherein the positioning frequency is chosen as the resonant frequency.

18. The method according to claim 16, comprising adjusting the frequency of an operating signal of a signal generator, wherein the operating signal is an operating signal of the resonant circuit.

19. The method according to claim 18, wherein the resonant frequency is determined depending on an input power and/or output power to/of the signal generator.

20. The method according to claim 16, comprising receiving the transmitted positioning signal by at least two primary-sided receiving units, wherein the at least two receiving units are direction-sensitive receiving units, wherein a main reception direction of the at least two receiving units are oriented differently.

21. The method according to claim 16, comprising digitizing the at least one received signal.

22. The method according to claim 16, comprising determining a spectrum of the received signal.

23. The method according to claim 22, wherein the positioning frequency is determined based on the spectrum of the received signal.

24. The method according to claim 22, comprising detecting a frequency interfering means based on the spectrum.

25. The method according to claim 16, wherein the positioning frequency is communicated from the secondary unit to the primary unit.

26. The method according to claim 16, wherein the relative position and/or orientation is determined by a primary-sided and/or a secondary-sided evaluation unit.

27. The method according to claim 16, wherein different secondary-sided transmitting units are operated with different frequencies.

28. A system for determining a relative position and/or orientation between a primary winding structure and a secondary winding structure of a system for inductive power transfer, wherein the system comprises at least one secondary-sided transmitting unit, wherein a positioning signal with a positioning frequency is transmittable by the secondary-sided transmitting unit, wherein the system comprises at least one primary-sided receiving unit, wherein a signal portion of the received signal with the positioning frequency is determinable, wherein the relative position and/or orientation is determinable depending on the determined signal portion, wherein the determined signal portion is communicated to the secondary side, wherein the relative position and/or orientation is determined by a secondary-sided control unit, wherein the signal received by the primary-sided receiving unit comprises multiple signal portions, wherein one of said signal portions corresponds to the received positioning signal generated by the transmitting unit, wherein determination of the signal portion with the positioning frequency comprises a first step where the positioning frequency is determined and a second step where the corresponding signal portion is determined.

29. A method for determining a relative position and/or orientation between a primary winding structure and a secondary winding structure of a system for inductive power transfer, wherein a positioning signal with a positioning frequency is transmitted by the secondary-sided transmitting unit, wherein a signal comprising the positioning signal is received by at least one primary-sided receiving unit, wherein a signal portion of the received signal with the positioning frequency is determined, wherein the relative position and/or orientation is determined depending on the determined signal portion, wherein the determined signal portion is communicated to the secondary side, wherein the relative position and/or orientation is determined by a secondary-sided control unit, wherein the signal received by the primary-sided receiving unit comprises multiple signal portions, wherein one of said signal portions corresponds to the received positioning signal generated by the transmitting unit, wherein determination of the signal portion with the positioning frequency comprises a first step where the positioning frequency is determined and a second step where the corresponding signal portion is determined.

* * * * *